Search Room
NO PRINTED SPECIFICATION AVAILABLE.
723
H. P. GATCHELL.
Coffee Pot.
No. 276. A. 1. Patented April 3, 1860.
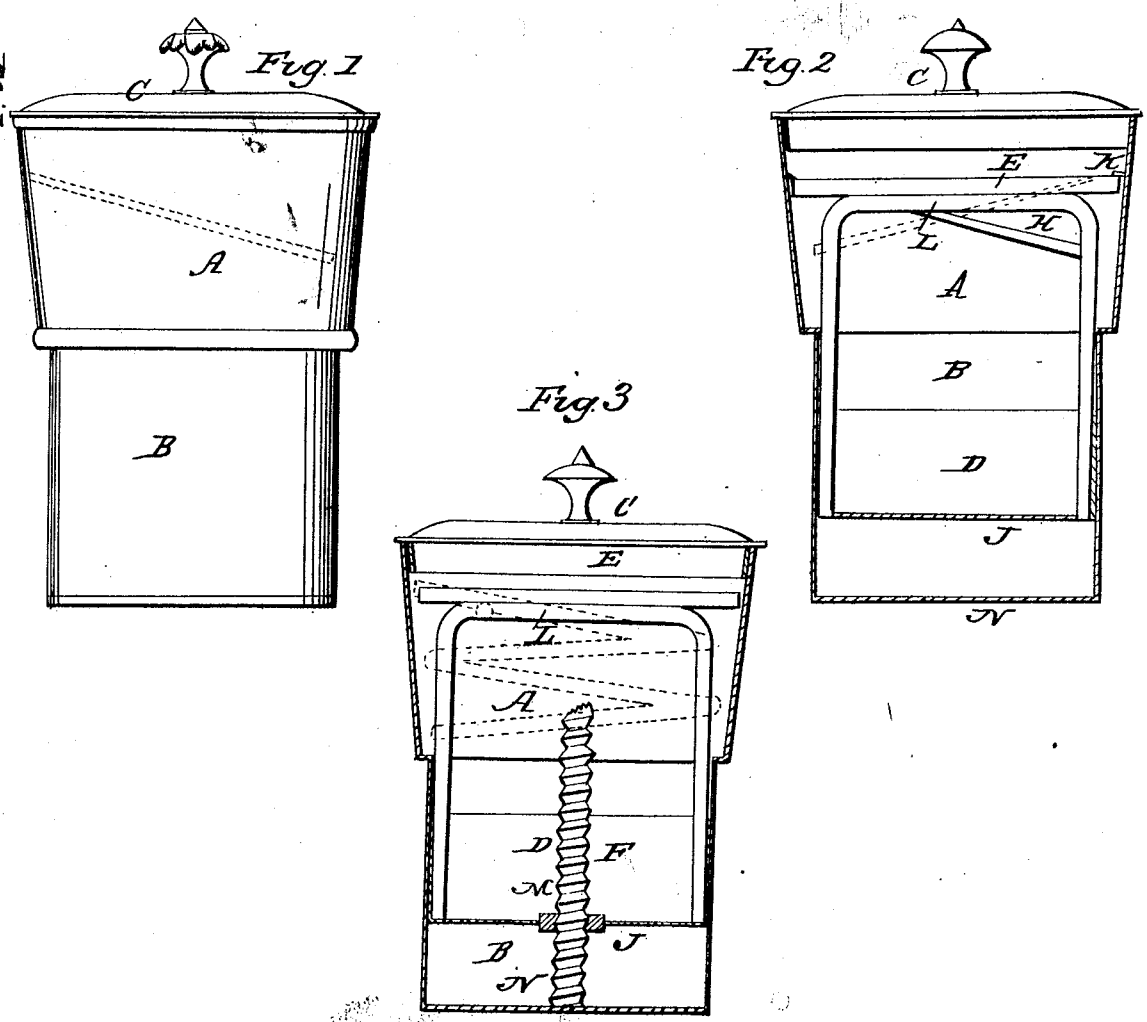
Witnesses
W. H. Bunnys
A. McClelland
Inventor
H. P. Gatchell
N. PETERS, Photo-Lithographer, Washington, D. C.
108